Nov. 3, 1925.  1,560,323
C. H. ROBERTSON ET AL
FEVER CURE AND FEVER PREVENTION MEANS
Filed June 28, 1923
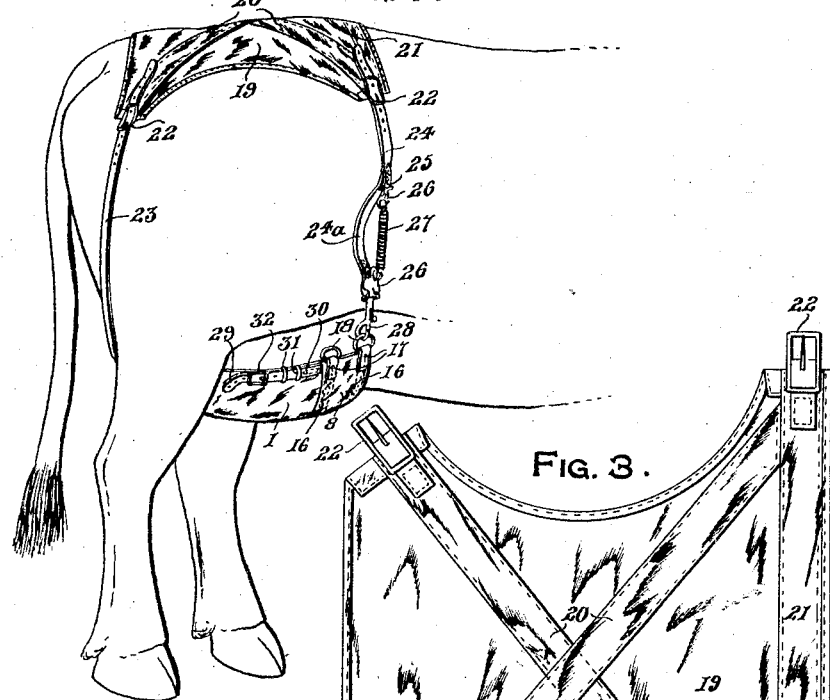
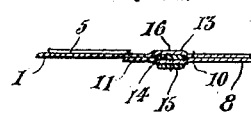
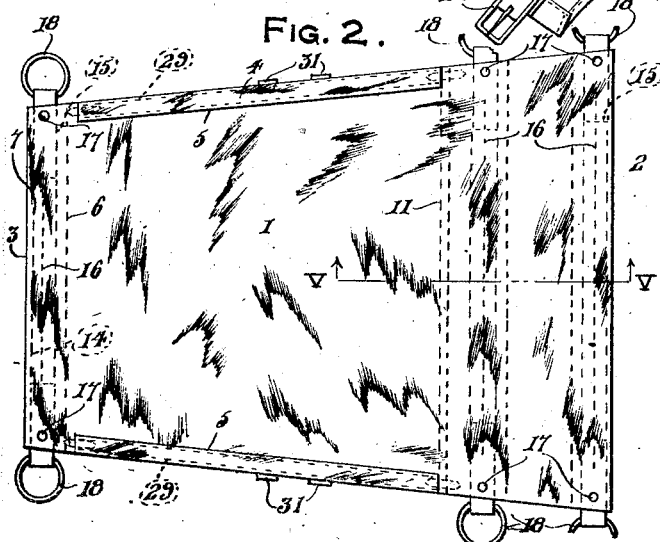
Inventors
C. H. Robertson
C. L. Allison
By F. N. Bryant
Attorney Patented Nov. 3, 1925.

1,560,323

UNITED STATES PATENT OFFICE.

CHARLES H. ROBERTSON AND CHARLES L. ALLISON, OF SALEM, OREGON.

FEVER CURE AND FEVER-PREVENTION MEANS.

Application filed June 28, 1923. Serial No. 648,264.

*To all whom it may concern:*

Be it known that we, CHARLES H. ROBERTSON and CHARLES L. ALLISON, citizens of the United States of America, residing at Salem, in the county of Marion and State of Oregon, have invented certain new and useful Improvements in Fever Cure and Fever-Prevention Means, of which the following is a specification.

This invention relates to certain new and useful improvements in fever cure and fever prevention means for milk producing animals, such as cows, goats or the like and has for its primary object to provide a device in the form of a strap or apron for enclosing and supporting the udder to cure and prevent fever in the milk and udder.

A further object of the invention is to provide an apparatus for curing and preventing fever in the udder of a milk producing animal in the form of an apron to support the udder for removing excessive strains and weight therefrom combined with a back sheet or blanket with resilient connections between the apron and blanket maintaining an even pressure over the entire surface of the udder.

A still further object of the invention is to provide an udder supporting apron of the type above set forth capable of adjustment to accommodate the same to udders of different sizes rendering the apparatus universal in its use for animals of different sizes.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 fragmentarily illustrates a cow equipped with the fever cure and fever prevention means showing the resilient connecting strap between the udder supporting apron and the back blanket.

Figure 2 is a top plan view of the udder supporting apron,

Figure 3 is a top plan view of the blanket supported on the back of the animal,

Figure 4 is a detail view of a portion of the strap showing the resilient attachment therefor, and Figure 5 is a detail sectional view taken on line V—V of Fig. 2, showing the pocket formations at the front end of the udder supporting apron.

In the art to which this invention relates, the flowing of milk into the udder begins shortly after calving, and with the flow of milk, there is generally a sudden influx of blood and serum creating milk fever injurious to the cow and calf, it being primary object of this invention to prevent and cure milk fever by supporting the udder in an elevated position under considerable pressure to relieve it of congestion and prevent the flow of blood into the udder to allow for a gradual appearance of the milk without causing any disturbance in the animal.

In the accompanying drawing which shows a preferred embodiment of the invention, the reference numeral 1 represents a fabric apron trapezoidal in plan view as shown in Fig. 2 having parallel front and rear edges 2 and 3 respectively and inclined side edges 4, the opposite side edges 4 being reinforced by inturned stitched side strips 5. The rear end 3 of the apron is folded upon itself and stitched upon the line 6 to form a cross pocket 7. The material at the front end 2 of the apron is folded upon itself as at 8 and is stitched upon the lines 9, 10 and 11 to form cross pockets 12 and 13 as clearly shown in Figs. 2 and 5.

A bracing and supporting strap is associated with each of the pockets 7, 12 and 13, a leather strap 14 extending through each of the pockets with the oppositely extending ends thereof folded upon themselves as at 15 adjacent the lower side of the apron 1 as shown in Fig. 5 and is anchored in the pocket against shifting movement by the stitching 16, the opposite ends of the straps being further secured to the apron as by rivets 17 while a ring 18 is secured in the looped ends of the straps.

A blanket 19 adapted for positioning upon the back of the animal is substantially rectangular in plan view having crossed reinforcing strips 20 and a forward reinforcing cross strip 21 while a belt buckle 22 is carried by each corner of the blanket 19 at the ends of the reinforcing strips.

The connection between the apron 1 and blanket 19 includes rearwardly positioned straps 23 having hook connections with the eyes 18 at the rear end of the apron 1 while the upper ends of the straps 23 are adjustably connected to the buckles 22 at the rear end of the blanket 19. The straps 24 connecting the forward corner edges of the apron and blanket are shown in detail in Fig. 4, the strap 24 being provided with a loop 25 intermediate its end and a terminal loop 25ᵃ with which loops hooks 26 are associated for engagement with the coil spring 27, and when the coil spring is engaged with the hooks 26, the strap 24 is provided with a contracted or looped portion 24ᵃ. The lower end of the strap 24 carries a snap hook 28 adapted for engagement with either of the rings 18 carried adjacent the front end 2 of the apron while the upper end of the strap is associated with a forwardly positioned buckle 22. To permit the use of a standard sized apron with udders of different proportions, the strap hooks 28 may be engaged with either of the forwardly positioned rings 18, and to obtain a more accurate adjustment or fit of the apron upon the udder, the opposite side edges of the apron adjacent the reinforced portion 5 carry straps 29, shown in Fig. 1 as being anchored at one end as at 30 to the apron and passing through guide loops 31 to be attached to a buckle 32. By the provision of the resilient strap connections 24 between the blanket and apron, the pressure of the apron upon the udder is uniformly distributed, and any slack caused by the change of position is taken up.

With a device of this character in position upon the udder of a cow or similar animal after calving, the udder is relieved of congestion and the sudden influx of blood and serum is materially reduced or prevented, permitting a natural and gradual flow of milk into the udder without causing any physical disturbance and working to the point of the elimination of milk fever in such animals.

While there is herein shown and described the preferred embodiment of the present invention, it is nevertheless to be understood that minor changes may be made therein without departing from the spirit and scope of the invention as claimed.

What is claimed as new is:—

1. In fever cure and prevention means for milk producing animals, an elongated udder apron, a resilient support for holding the same in engagement with an udder, and adjustable means for reducing the operative size of the apron to accommodate the same to udders of different sizes.

2. In fever cure and prevention means for milk producing animals, an udder apron, a resilient support for holding the same in engagement with an udder, adjustable means for reducing the operative size of the apron to accommodate the same to udders of different sizes, said apron being formed of a fabric sheet folded upon itself at one end and stitched to provide a plurality of cross pockets, a belt extending through each pocket and anchored therein and attaching means for the resilient supports carried by the ends of the straps.

In testimony whereof we affix our signatures.

CHARLES H. ROBERTSON.
CHARLES L. ALLISON.